No. 779,643. PATENTED JAN. 10, 1905.
J. C. DIXON.
SCALE ATTACHMENT.
APPLICATION FILED APR. 13, 1904.
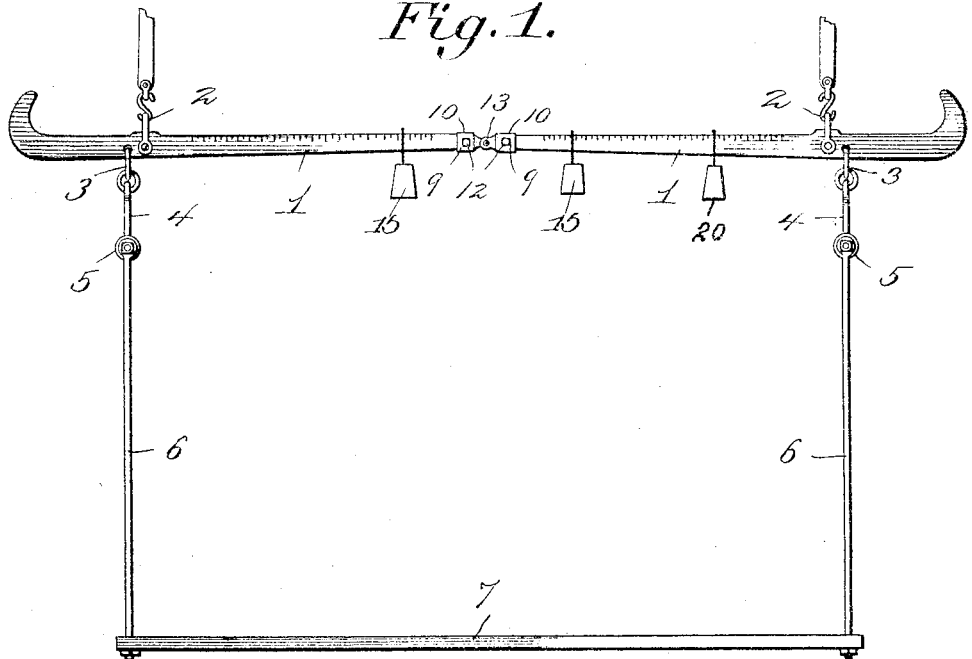
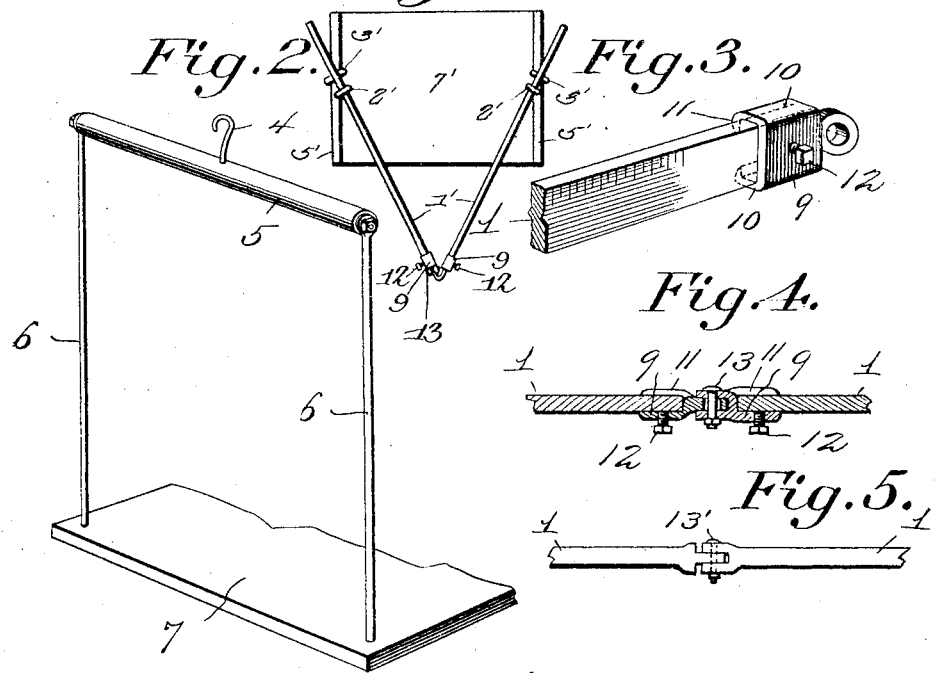
Witnesses  
Josiah C. Dixon, Inventor.  
by C. A. Snow & Co.  
Attorneys No. 779,643. Patented January 10, 1905.

UNITED STATES PATENT OFFICE.

JOSIAH C. DIXON, OF HANFORD, CALIFORNIA.

SCALE ATTACHMENT.

SPECIFICATION forming part of Letters Patent No. 779,643, dated January 10, 1905.

Application filed April 13, 1904. Serial No. 203,009.

*To all whom it may concern:*

Be it known that I, JOSIAH C. DIXON, a citizen of the United States, residing at Hanford, in the county of Kings and State of California, have invented a new and useful Scale Attachment, of which the following is a specification.

This invention relates to weighing-scales, and has for its object to provide means whereby a pair of ordinary steelyard-scales may be employed for the weighing of heavy and of unwieldy loads.

A further object of the invention is to provide a device in the nature of an attachment whereby a pair of scales of the steelyard type may be connected together in order to balance the load, the device being intended principally for use in ascertaining approximately the weight of cattle or other animals which cannot ordinarily be weighed on the character of scales available for use by the ordinary farmer, although of course it is to be understood that the invention is applicable to the weighing of articles and loads of any nature.

With these and other objects in view, as will more fully hereinafter appear, the invention consists in the novel construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is an elevation of a scale attachment arranged in accordance with the invention. Fig. 2 is a detail perspective view of a portion of the device. Fig. 3 is a similar view showing one of the scale-beams provided with a detachable hinge member. Fig. 4 is a sectional plan view showing the connections between the adjacent ends of two scale-beams. Fig. 5 is a plan view illustrating a modification of the invention. Fig. 6 is a plan view illustrating a slightly-modified arrangement of the scale.

Similar numerals of reference are employed to indicate corresponding parts throughout the several figures of the drawings.

The weighing-scales most generally in use by farmers are devices of the steelyard type; but their use is generally restricted to the weighing of comparatively small loads, and it is practically impossible to weigh any animal of greater weight or size than a hog.

The present invention therefore aims more particularly to provide a scale of this type for the purpose of enabling the farmer to ascertain approximately the weight of cattle or horses, and thus render it unnecessary for him to depend wholly on the weights recorded at the receiving-point. To accomplish this, two or more steelyards are employed, and these are connected in such manner to a platform or cage that the animal to be weighed may readily step thereon, the steelyards being so connected as to move simultaneously and movement of one insuring a corresponding movement of the other in the same direction, so that the shifting of the animal's position will not alter the position of the steelyards after the latter have been properly balanced by the movement of a poise or poises.

The beams 1 of the scales are of the usual type, and, in fact, the invention is intended for use in connection with steelyards of the character which may be purchased in open market, it being necessary to employ two steelyards of the same construction and to connect them for mutual movement. The suspension rings or links 2 of the beams are hung from suitable supports when the scale is to be used, and on the lower links 3 are hook-supports 4, that are centrally connected to cross-bars 5. These cross-bars are connected by tension-bars 6 to a platform 7. The supports at the opposite ends of the platform are of precisely the same construction, so that if the load is directly at the center of the platform the inner or poise-bearing portions of the scale-beams will be elevated to an equal extent; but if the load be shifted to a point adjacent to one end of the platform the scale-beam at that end will be elevated to a greater extent than the mating scale-beam. In order to avoid this difficulty, the adjacent ends of the scale-beams are connected to each other so that they will move to an equal extent. Where the scale-beams are of the usual construction, a hinge-leaf is detachably secured to each beam. The leaf 9 of each hinge member is provided with edge flanges 10, having downturned portions 11, adapted to engage with that face of the scale-beam opposite the main body of the leaf-hinge, the parts being so constructed as to permit of the ready removal of the leaf-hinge when the single steelyards are to be used for ordinary purposes. Each of the hinge members is provided with a threaded opening for the passage of a set-screw 12, which is turned until it engages against the vertical face of the beam and brings the ribbed members 11 into contact with the opposite faces of said beam, and to remove the hinges it is merely necessary to loosen the screw. The two hinge members are connected together by a removable pin 13, and the pin-receiving opening of one or of both members are preferably elongated in a horizontal direction, so as to permit freedom of movement of the two steelyards on their respective supporting-fulcrums, although this movement may be accommodated for by making the beam-supports sufficiently flexible.

When an animal or a heavy load is to be weighed, the two scale-beams are properly hung, and the hinge-leaves are secured in position to the ends of the beams and are connected by the pivot-pin. The cross-bars 5 and the platform are then hung on the beams, and the load is placed in position. It is not essential that the load be placed directly in the center of the platform, and this is convenient in the weighing of animals where the animal is likely to move during the weighing operation. The two scale-beams will move to a uniform extent, regardless of the position of the load, and the latter may be balanced by the use of a single poise 20 on one of the scale-beams, or, if desired, a poise may be used for each beam.

In the manufacture of scale-beams intended for the purpose described the ends of the beams may be provided with interfitting pivoted connected members of the character shown in Fig. 5, a pivot-pin 13' being employed to connect them; but it is preferred to manufacture the hinge members separately in order that they may be used in the nature of an attachment to the numerous steelyard-scales already in use.

Before using the scales they are of course adjusted by the employment of the usual regulating-poises 15.

While the scale-beams are shown in the present instance as arranged end to end in the same plane, it is to be understood that this arrangement is followed when the platform is of suitable length. With a shorter platform or support the carrying ends of the beams may be brought nearer together, so that they will be arranged on convergent lines or approximately in triangular form, as shown in Fig. 6, the beams 1' being provided with suspended links 2'. The lower links 3' are connected to cross-bars 5', and the opposite ends of said cross-bars are suitably connected to a platform 7'.

Having thus described the invention, what is claimed is—

1. The combination with a pair of steelyard-beams, of a pivotal connecting means between the normally free ends of the beams, a load-receiving platform, detachable cross-bars arranged transversely of the beams and connected to the platform, and hook members forming a detachable connection between the bars and the beams.

2. A steelyard attachment comprising a pair of hinge-leaves having edge flanges for embracing a pair of steelyards, means for pivotally connecting the leaves to each other, both of said leaves having threaded openings, and set-screws extending through said threaded openings for engagement with the faces of the steelyards.

In testimony that I claim the foregoing as my own I have hereto affixed my signature in the presence of two witnesses.

JOSIAH C. DIXON.

Witnesses:
JOHN F. PRYOR,
P. H. JORDAN.